United States Patent [19]

Yoshino

[11] Patent Number: 6,024,069
[45] Date of Patent: Feb. 15, 2000

[54] CONTROLLER FOR AN INTERNAL COMBUSTION ENGINE

[75] Inventor: Takahiro Yoshino, Yokohama, Japan

[73] Assignee: Nissan Motor Co., Ltd., Yokohama, Japan

[21] Appl. No.: 09/087,971

[22] Filed: Jun. 1, 1998

[30] Foreign Application Priority Data

Jun. 2, 1997 [JP] Japan .................................. 9-144171

[51] Int. Cl.⁷ .................................................. F02B 17/00
[52] U.S. Cl. ........................................... 123/295; 701/103
[58] Field of Search .................................. 123/295, 480, 123/305; 701/102, 103

[56] References Cited

U.S. PATENT DOCUMENTS

| | | | |
|---|---|---|---|
| 5,755,198 | 5/1998 | Grob et al. | 123/295 |
| 5,785,031 | 7/1998 | Akimoto et al. | 123/295 |
| 5,848,580 | 12/1998 | Mashiki | 123/295 |
| 5,875,756 | 3/1999 | Kamura et al. | 123/295 |
| 5,881,693 | 3/1999 | Mizuno | 123/295 |
| 5,896,840 | 4/1999 | Takahashi | 123/295 |

FOREIGN PATENT DOCUMENTS 62-110536  5/1987  Japan .

OTHER PUBLICATIONS

Press Information Nissan Direct–Injection Engine, NEO DI Gasoline Engine Diesel Engine.
Patent Abstract of Japan—JP 9636902—Torque controller of Engine—Feb. 22, 1997.
Co–Pending U.S. Application 09/081,071 May 19, 1998.

*Primary Examiner*—Willis R. Wolfe
*Assistant Examiner*—Hieu T. Vo
*Attorney, Agent, or Firm*—Foley & Lardner

[57] ABSTRACT

The invention stabilizes combustion performance upon a change from operation with stratified combustion to operation with homogeneous combustion. The lower limit for the equivalence ratio just after a change from operation with stratified combustion to operation with homogeneous combustion is set at a value greater than set under steady conditions so as to avoid adverse influence of residual external and internal EGR (exhaust gas recirculation).

8 Claims, 7 Drawing Sheets

HOMOGENEOUS TRANSMIT LOWER
LIMITER HTFMNT1

CONTROLLER FOR AN INTERNAL COMBUSTION ENGINE

BACKGROUND OF THE INVENTION

This invention is directed to an internal combustion engine control unit and, more particularly, to a controller for an engine operable with both stratified and homogeneous combustion, switched according to engine operating conditions.

A control unit has been proposed (for example, in Japanese Patent Kokai No. 62-110536) for electronic control of a throttle valve (referred to hereinafter as an electronic controlled throttle valve) used in an internal combustion engine. The control unit sets a target engine torque based on accelerator operation degree and engine speed and controls the degree of opening the throttle valve to obtain the target engine torque.

However, such a conventional unit is arranged to determine the degree of opening of the throttle valve based on target engine torque and engine speed only. Thus, such a conventional unit cannot be directly applied to an internal combustion engine having its air-fuel ratio controlled according to engine operating conditions.

It is required to change both the degree of opening of the throttle valve and the amount of fuel metered to the engine in order to change the air-fuel ratio, while maintaining engine speed and torque. For example, the required amount of air permitted to enter the engine is greater and the required amount of fuel metered to the engine is smaller at lean air-fuel ratios as compared to the stoichiometric air-fuel ratio. Japanese Patent Application No. 8-36902 (filed Feb. 23, 1996) proposes control of the engine torque to its target value while maintaining the air-fuel ratio at its target value. The entire contents of this Japanese Patent Application is incorporated herein by reference.

In this design, if the target equivalence ratio (which is proportional to the reciprocal of the air-fuel ratio) changes, the required amount of air to the engine and the required amount of fuel to the engine will change accordingly. The amount of air to the engine changes with a delay because the amount of air to the engine is delayed due to the volume of the intake system, even though the throttle valve is controlled to its target position according to the changed target equivalence ratio. If the amount of fuel to the engine is controlled according to the amount of air to the engine based on the changed target equivalence ratio, the amount of fuel to the engine will change to a great extent, which in turn changes the torque in a stepped fashion at an initial stage of the changing operation.

For this reason, in conventional control, phase delay is corrected in such a manner as to change the target equivalence ratio with a delay corresponding to the delay with which the amount of air to the engine changes. The above application discloses a phase delay correction for the amount of fuel calculated based on the actual amount of air to the engine as well as a direct phase delay correction for the target equivalence ratio. This technique is similar to a target equivalence ratio phase delay correction. This technique can change the equivalence ratio gradually toward its target value while smoothly changing the torque at a constant rate.

A new technique has recently been developed for use with a spark ignition type gasoline engine to permit combustion at very lean air-fuel ratios so as to improve fuel economy and exhaust gas purifying performance to a great extent by injecting fuel directly into the combustion chamber. Such a technique involves injecting fuel during the compression stroke at low and intermediate load conditions to form a combustible mixture in a stratified condition around the spark plug for operation with stratified combustion. Detailed description of such techniques is set forth in Japanese Patent Application P9-135269 (filed May 26, 1997), P9-137369 (filed May 28, 1997), P9-132673 (filed May 23, 1997), P9-129053 (filed May 20, 1997), and corresponding U.S. patent application Ser. No. 09/081,071, entitled "Direct Injection Gasoline Engine with Stratified Charge Combustion and Homogeneous Charge Combustion", filed under Attorney Docket Number 040679/0625 on May 19, 1998. The entire contents of these five documents are incorporated herein by reference.

In order to ensure the required torque with a limited cylinder volume, the engine is also required to operate with homogeneous combustion by injecting fuel during the intake stroke to form a homogeneous mixture for operation with homogeneous combustion. Fuel can be injected directly into the cylinder or into another fuel injector in the intake port(s).

It is, therefore, a known practice to make a switch between stratified and homogeneous combustion according to the engine operating conditions.

One may consider making a delay correction for the target equivalence ratio according to the delay with which the amount of air to the engine changes, in order to change the torque smoothly while the target equivalence ratio changes when a change is made between stratified and homogeneous combustion. However, operation with stratified combustion and homogeneous combustion are different from each other with respect to optimum external EGR (exhaust gas recirculation) ratio (representing exhaust gas which is recirculated by a separate EGR system) and internal EGR ratio (representing exhaust gas left in a cylinder) as well as with respect to target equivalence ratio. If these factors are unbalanced, emissions and driving stability can be degraded.

In greater detail, it is required, during operation with stratified combustion, to perform external EGR for NOx reduction. EGR lowers the combustion temperature which in turn lowers NOx emission. Since the air-fuel ratio is extremely lean during the operation with stratified combustion and during operation with homogeneous combustion just after a change to operation with homogeneous combustion, external EGR is inhibited during a change from stratified to homogeneous combustion to avoid deterioration of combustion performance and power output. It is possible to reduce the emission of NOx while improving fuel economy by leaning the air-fuel ratio to a sufficient extent since the engine is operating under conditions where NOx emission level is relatively low.

Upon a change from operation with stratified combustion (very lean) to operation with homogeneous combustion (lean), however, the residual EGR gas in the intake system may degrade the combustion performance and thus the acceleration performance even though a command is outputted to stop EGR at the same time as operation with stratified combustion is completed. An attempt to attach importance to the acceleration performance by changing the equivalence ratio promptly will cause the equivalence ratio to change at a greater rate than the EGR rate. This also degrades combustion performance. Even when external EGR is stopped early enough during operation with stratified combustion, the influence of the interior EGR gas residing in the combustion chamber during the operation with stratified combustion may remain after the change to homogeneous combustion to degrade combustion performance.

Since the amount of air to the engine increases with a delay, although the target EGR ratio increases with a delay upon a change from operation with homogeneous combustion to operation with stratified combustion, it is possible, with no problem, to perform a sufficient degree of EGR in a transient condition just after a change to operation with stratified combustion.

SUMMARY OF THE INVENTION

In view of the above considerations, an object of the invention is to provide an internal combustion engine control unit which can provide stable combustion and smooth changes by controlling the equivalence ratio in an appropriate manner just after a change from operation with stratified combustion to operation with homogeneous combustion.

The invention provides a controller for an internal combustion engine having a cylinder and an injector to inject fuel directly into the cylinder. The controller has a discriminating section to detect a change of combustion in the cylinder from stratified combustion to homogeneous combustion. The controller also has a section to calculate a ratio between air and fuel for the cylinder. This ratio between air and fuel for the cylinder can be represented as an air-fuel ratio, as a target equivalence ratio (which is proportional to the reciprocal of the air-fuel ratio), or as another parameter that represents the ratio between air and fuel in a cylinder. The controller further includes a limiter to limit the ratio in a range (different from that used during steady-state homogeneous combustion) when the change of combustion in the cylinder is detected.

BRIEF DESCRIPTION OF THE DRAWINGS

The invention will be described in further detail below with reference to the accompanying drawings, wherein.

DESCRIPTION OF PREFERRED EMBODIMENTS OF THE INVENTION

One embodiment of the invention will be described with reference to FIGS. 1 to 9.

Figure 1:
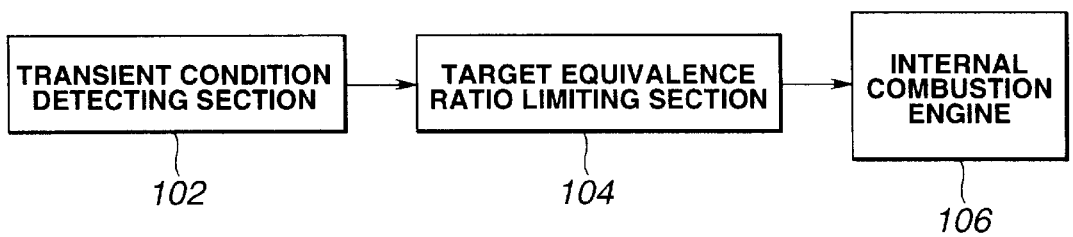
FIG. 1 is a block diagram showing the overall arrangement and function of the invention.

FIG. 1 shows an overall arrangement of the invention. As shown in FIG. 1, the invention has a transient condition detecting section 102 which detects a change from stratified combustion to homogeneous combustion. A target equivalence ratio limiting section 104 limits the target equivalence ratio to a certain range when a change from stratified to homogeneous combustion is detected. This range is then applied when controlling the air and fuel provided to engine 106.

Figure 2:
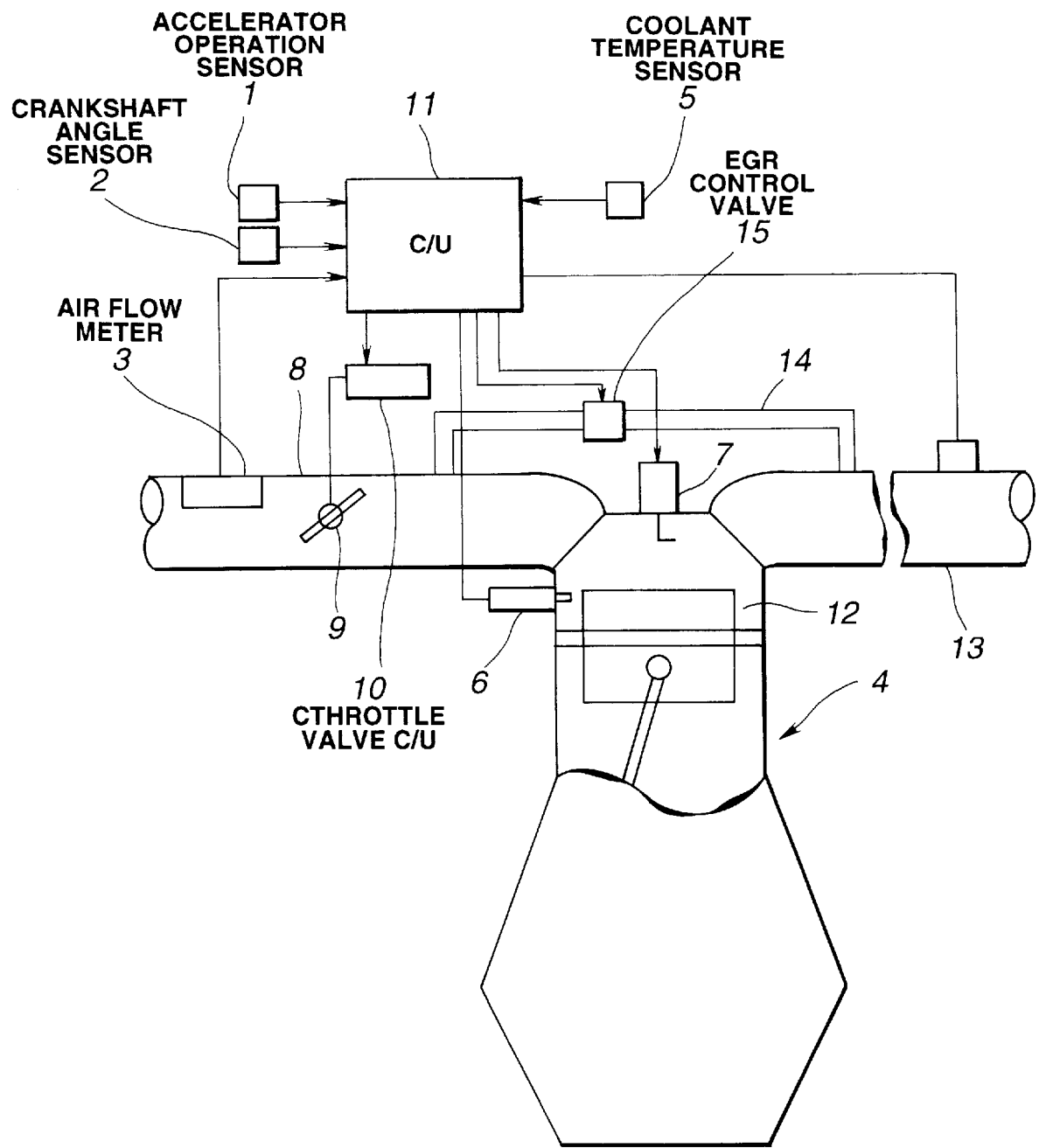
FIG. 2 shows a system arrangement of one embodiment of the invention.

FIG. 2 shows one detailed system arrangement.

An accelerator operation sensor 1 detects the degree to which the driver depresses the accelerator pedal.

An engine rotation speed detector, in the form of a crankshaft angle sensor 2, produces a position signal at a predetermined number of degrees of rotation of the crankshaft (for a predetermined unit crankshaft angle) and a reference signal for each cylinder stroke phase difference. It is also possible to detect the engine speed Ne by measuring the number of position signals produced over a unit time or measuring a period of production of reference signals. An airflow meter 3 is provided for detecting the amount of air introduced into the engine 4 in a predetermined unit time. A coolant temperature sensor 5 detects the temperature of the coolant used in the engine 4.

The engine 4 has cylinders, each having a fuel injector 6 for injecting fuel directly into the corresponding combustion chamber 12, and a spark plug 7 for producing sparks in the combustion chamber 12. Under low and intermediate load conditions, the fuel is injected, during a compression stroke, into the combustion chamber 12 to charge a combustible mixture in a stratified form around the spark plug 7 for operation with stratified combustion. Under high load conditions, the fuel is injected, during an intake stroke, into the combustion chamber 12 to charge a combustible mixture substantially at a homogeneous air-fuel ratio over the entire cylinder for operation with homogeneous combustion.

The internal combustion engine 4 includes an intake passage 8 provided with a throttle valve 9. The degree of opening of the throttle valve 9 is controlled in an electronic manner by a throttle valve control unit 10.

Sensor signals from the various sensors are inputted into a control unit (controller) 11. One suitable control unit is a Hitachi SH series processor programmed to implement the sections described herein. The control unit 11 controls the throttle valve through the throttle valve control unit 10 based on the sensed operating conditions, drives the fuel injector 6 to control the fuel supply (the amount of fuel metered into the engine), and sets the spark timing to produce a spark at the spark plug 7 at the set spark timing.

The engine also has an EGR passage 14 for recirculating a part of the exhaust gases from the exhaust passage 13 into the intake passage 8, and an EGR unit comprised of an EGR control valve 15 provided in the EGR passage 14. EGR control is performed based on a control signal produced from the control unit 11, during operation with stratified combustion (sometimes called super or very lean combustion because it is carried out at air-fuel ratios of 40 to 50). EGR is inhibited during operation with homogeneous lean combustion (air-fuel ratio of about 20). EGR control is again performed during operation with homogeneous combustion at the stoichiometric air/fuel ratio (air-fuel ratio of 14.7).

Figure 3:
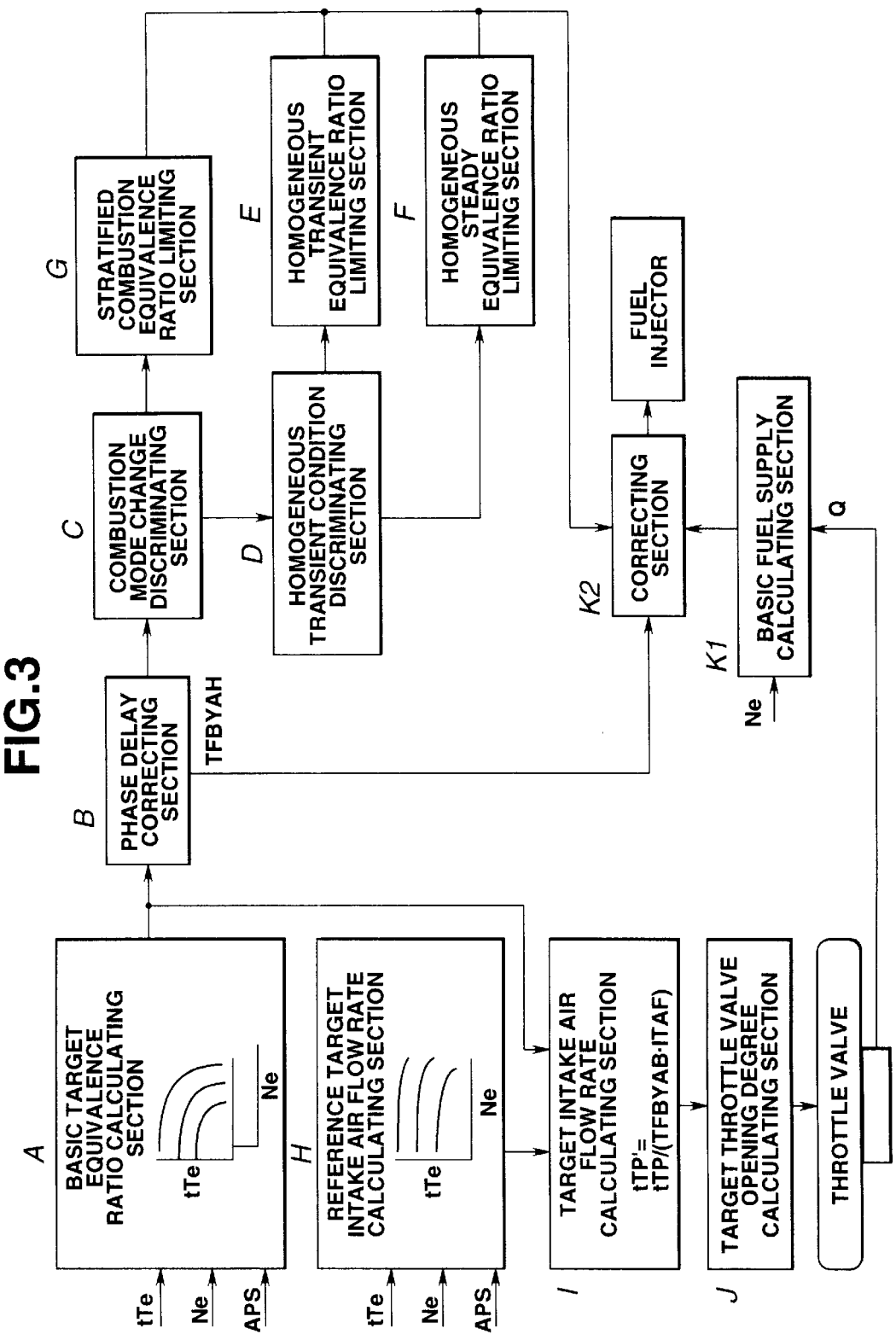
FIG. 3 is a block diagram showing the functional arrangement of the above embodiment.

FIG. 3 shows a functional arrangement of the processing performed in the control unit 11. The sections referred to herein can be implemented in hardware, software, or a combination of both.

A basic target equivalence ratio calculating section A calculates a basic target equivalence ratio TFBYAB from a map based on basic engine operating conditions such as, for example, the engine speed Ne and target torque tTe (load). The target torque tTe is set based on, for example, the accelerator operation APS and the engine speed Ne. In greater detail, the operation with a lean air/fuel ratio is permitted or inhibited depending upon various factors including the coolant temperature, the time elapsed after the engine starts, the vehicle speed, the acceleration, the accessories operated during engine idling and the like. Furthermore, a change may be made between operation with stratified combustion and operation with homogeneous combustion. For these reasons, a plurality of maps for the target equivalence ratio are provided. If a change is made between operation with stratified combustion and operation with homogeneous combustion according to changes in the engine operating conditions (including coolant temperature), the basic target equivalence ratio TFBYAB is changed in a stepped form according to a difference between the combustion efficiencies of operation with stratified combustion and operation with homogeneous combustion.

A phase delay correcting section B performs a phase delay correction for the basic target equivalence ratio TFBYAB calculated in the basic target equivalence ratio calculating section A. The phase delay correction is made in order to compensate for the delay of the actual equivalence ratio in time relative to a change in the target equivalence ratio since the amount of air to enter the engine (intake air flow rate) will change with a delay because of a delay of operation of the throttle valve and the volume of the intake system, even though the control starts to realize a target intake air flow rate corresponding to a change in the basic target equivalence ratio TFBYAB resulting from engine operating condition changes. The amount of fuel metered to the engine can follow the target equivalence ratio change with almost no delay.

In the situation where the basic target equivalence ratio is changed in a stepped fashion according to a change in the combustion mode, such a phase delay correction is made for the stepped changes. In greater detail, the phase delay correction is made by using correction factors set to provide at least a first order lag corresponding to the delay of operation of the throttle valve corresponding to a target equivalence ratio change and the volume of the intake system. It is noted that a weighted average can also be used to make a correction for first order lag. The phase delay correction can also be made simply by making a delay correction based on the intake system volume, which is a factor having a great effect.

A combustion mode change discriminating section C compares the phase-corrected target equivalence ratio TFBYAH with a threshold value to discriminate an actual change between operation with stratified combustion and operation with homogeneous combustion. In greater detail, the fuel injection timing and the spark timing are changed to change from operation with stratified combustion to operation with homogeneous combustion when the target equivalence ratio TFBYAH is equal to or greater than the threshold value, during operation with stratified combustion. A change from operation with homogeneous combustion to operation with stratified combustion is made when the phase-corrected target equivalence ratio TFBYAH is less than a threshold value. Different threshold values may be set for operation with stratified combustion and operation with homogeneous combustion, taking into account differences in combustion efficiency between operation with stratified combustion and operation with homogeneous combustion.

A homogeneous transient condition discriminating section D detects a transient condition of operation with homogeneous combustion just after a change is made from operation with stratified combustion to operation with homogeneous combustion. In more detail, section D detects the transient condition of operation with homogeneous combustion when a difference between (1) the basic target equivalence ratio TFBYAB calculated for operation with homogeneous combustion before phase delay correction and (2) the phase-corrected target equivalence ratio is equal to or greater than a predetermined value, after the combustion mode change discriminating section C discriminates a change from operation with stratified combustion to operation with homogeneous combustion.

A homogeneous transient equivalence ratio limiting section E limits the phase-delay-corrected target equivalence ratio between upper and lower limits set according to the transient condition when the homogeneous transient condition discriminating section D detects a transient condition of operation with homogeneous combustion just after a change from operation with stratified combustion to operation with homogeneous combustion. The upper limit is set at the same value as an upper limit set for the steady condition for operation with homogeneous combustion. The lower limit is set at a value greater than the lower limit for the steady condition. It is the current practice to change the EGR ratio, even during combustion with stratified combustion, according to engine operating conditions such as engine speed, load and the like. In the invention, the residual EGR gas condition in the intake system after the combustion mode change is estimated based on the EGR rate determined by engine operating conditions (engine speed, load and the like) just before (or near) the combustion mode change. The lower limit is set at a value to ensure stable homogeneous combustion based on the estimated EGR gas residual condition. A higher target equivalence ratio results in more fuel being provided to the engine.

A homogeneous steady equivalence ratio limiting section F limits the phase-delay-corrected target equivalence ratio between upper and lower limits set according to the steady condition after the homogeneous transient condition discriminating section D detects that the transient condition to operation with homogeneous combustion has been completed and the engine has moved to a steady condition. The upper and lower limits are set according to engine operating conditions (engine speed, load and the like). The upper limit is set at the same value as set for the transient condition. The lower limit may be set at a smaller value since the target equivalence ratio required to ensure stable combustion can be set at a value smaller than set for the transient condition.

A stratified combustion equivalence ratio limiting section G limits the phase-delay-corrected target equivalence ratio between upper and lower limits set according to the stratified condition when section C detects a change to operation with stratified combustion. The upper and lower limits are set according to the engine operating conditions (engine speed, load and the like). It should be noted that the upper limit for the homogeneous-to-stratified transient condition may be set at a value smaller than the upper limit for the stratified steady condition in order to ensure combustion stability under the transient condition just after a change from operation with homogeneous combustion to operation with stratified combustion.

Figure 4:
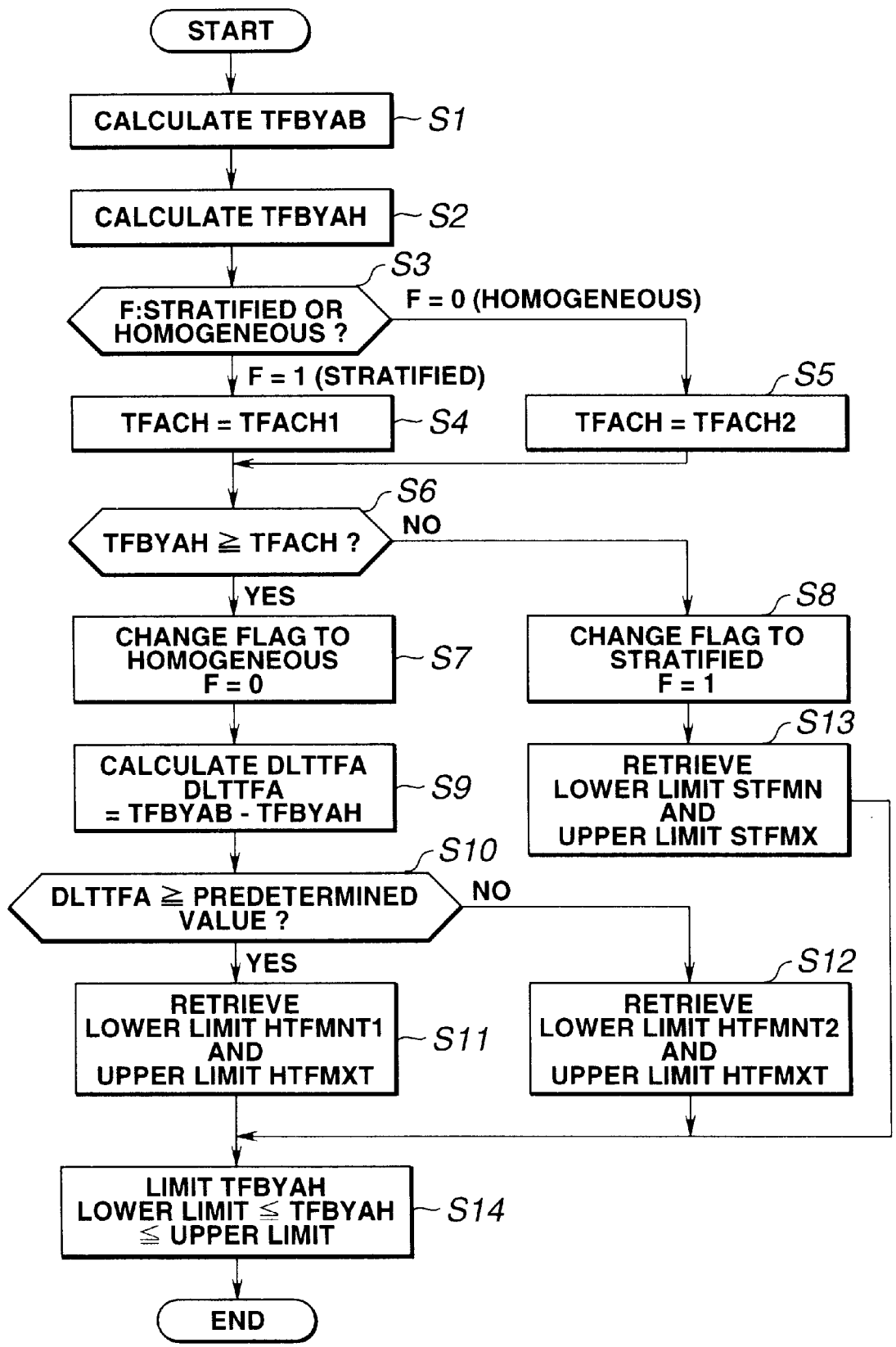
FIG. 4 is a flow diagram showing a target equivalence ratio calculating routine used in the above embodiment.

FIG. 4 is a flow diagram showing one suitable routine for changing the upper and lower limits for the target equivalence ratio according to combustion mode changes and whether the engine is in a transient condition or a steady condition.

In step 1, a basic target equivalence ratio TFBYAB is calculated from a map according to the engine operating conditions such as engine speed, load and the like.

In step 2, a phase delay correction is made for the basic target equivalence ratio TFBYAB to calculate a corrected value TFBYAH.

Figure 6:
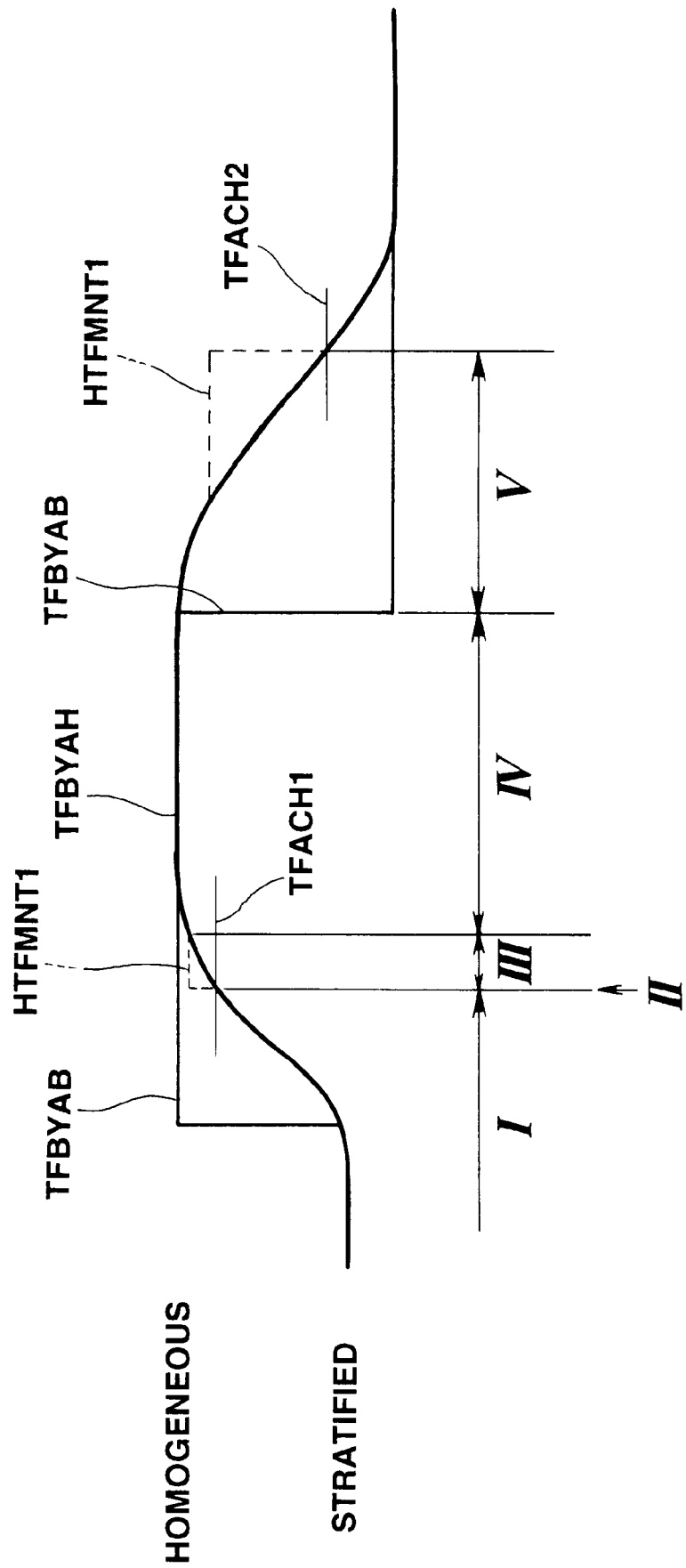
FIG. 6 shows various parameters during different combustion conditions I to V (both transient and steady states).
Figure 7:
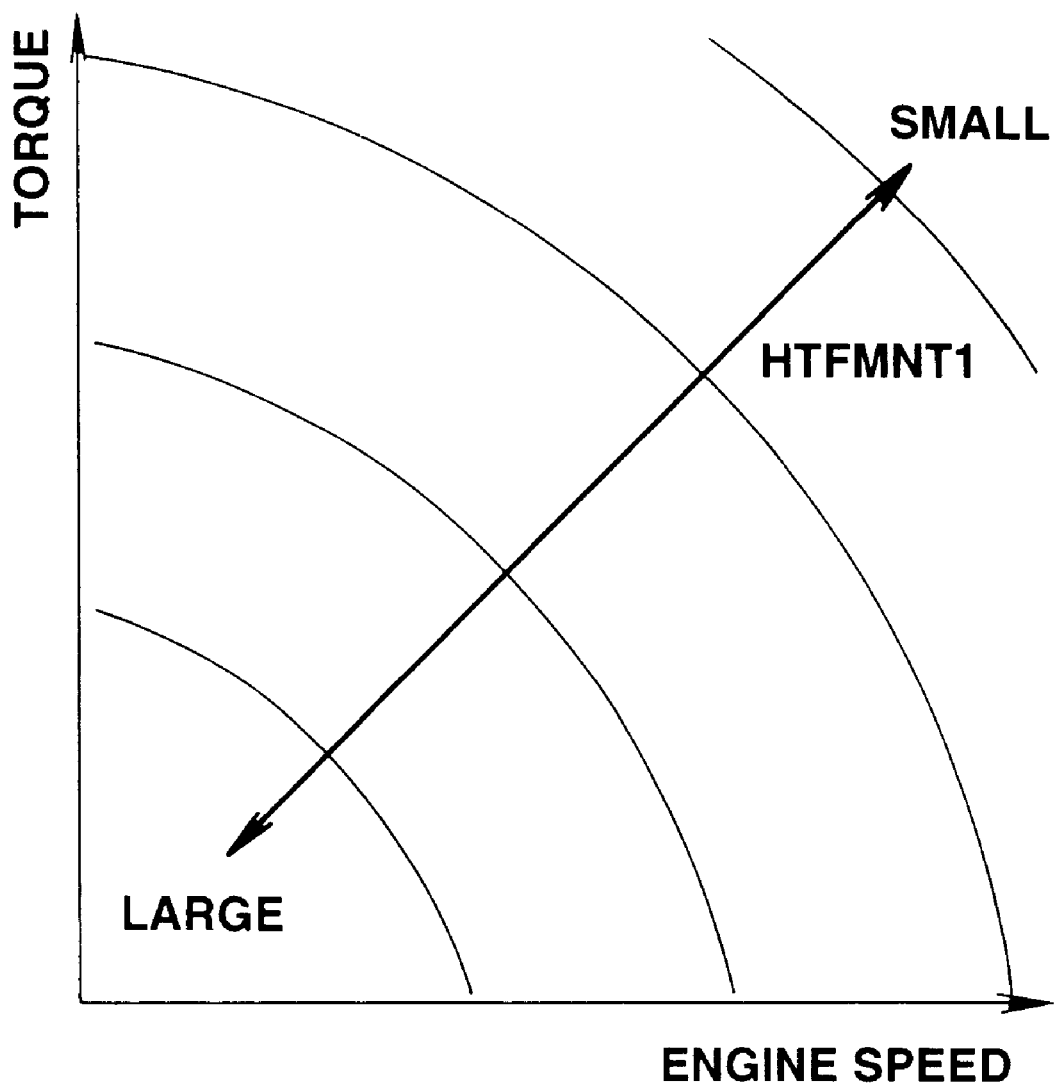
FIG. 7 is an example of map for calculating limit on target equivalence ratio.

In step 3, a determination is made as to whether the engine is operating with stratified combustion or homogeneous combustion. This determination is made with the use of a flag F. When it is determined at step 3 that the engine is operating under stratified charge combustion according to the flag F (F=1) (in other words, it was decided to operate with stratified charge combustion during prior processing of this routine), the processing proceeds to step 4. At step 4, threshold value TFACH is rewritten to a value TFACH1. When it is determined that the engine is operating with homogeneous charge combustion (F=0), the processing proceeds to step 5. At step 5, threshold value TFACH is rewritten to a value TFACH2 (which is less than TFACH1). (FIG. 6 shows TFACH1 and TFACH2.) After steps 4 and 5, processing proceeds to step 6.

At step 6, a phase-delayed target equivalence TFBYAH is compared to the threshold TFACH (i.e., compared with TFACH1 for stratified combustion and with TFACH2 for homogeneous combustion). If it is determined that TFBYAH is greater (or equal to) TFACH (homogeneous), the processing goes to step 7, and if not, the processing goes to step 8.

In step 7, the flag F is cleared to 0, the fuel injection timing is changed, the spark timing is changed, and the combustion mode is changed to homogeneous combustion. (If the engine is already in the homogeneous combustion mode, the engine remains in the homogeneous combustion mode.)

In step 8, the flag is set to 1, the fuel injection timing is changed, the spark timing is changed, and the combustion mode is changed to stratified charge combustion. (If the engine is already in the stratified charge combustion mode, the engine remains in the stratified charge combustion mode.)

If a change is made from stratified combustion to homogeneous combustion or if homogeneous combustion is continued, then the processing proceeds to step 9 wherein a difference DLTTFA (=TFBYAB−TFBYAH) between the phase-delay-corrected target equivalence ratio TFBYAH and the basic target equivalence ratio TFBYAB (calculated in step 1) is calculated.

In step 10, a determination is made as to whether or not the difference DLTTFA is equal to or greater than a predetermined value. If the difference is equal to or greater than the predetermined value, then this means that the engine is operating in a transient condition just after a change to operation with homogeneous combustion and the program proceeds to step 11 wherein lower and upper limits HTFMNT1 and HTFMXT for the target equivalence ratio under homogeneous combustion transient conditions are calculated from maps based on engine speed and load such as the one shown as an example in FIG. 7. When the load and the engine speed are low, stability of the combustion is also worse, because the internal EGR is large and fresh air weakly flows into the cylinder. Accordingly, in low-load or low-engine-speed condition, the value of the lower limit for homogeneous transient equivalence ratio limitation is larger (richer) so that the combustion is more stabilized. If the difference DLTTFA is less than the predetermined value, then this means that the engine is operating in a homogeneous combustion steady condition and the program proceeds to step 12 wherein lower and upper limits HTFMNT2 and HTFMXT for homogeneous combustion steady conditions are calculated from maps based on engine speed and load.

Although the upper limits for transient and steady conditions are set at the same value, the lower limit HTFMNT1 for transient conditions is set at a value greater than the lower limit HTFMNT2 for steady conditions. In more detail, the lower limit during a stratified to homogeneous transient is based on the EGR rate and inner EGR gas amount, which are dependent on the engine speed and load during operation with stratified combustion just before a change from stratified combustion to homogeneous combustion, at such a value as to avoid adverse influence on combustion under transient conditions during a change to homogeneous combustion. The lower limit is raised to require a higher minimum amount of fuel to compensate for the EGR gas in the cylinders.

At step 13, if the combustion mode is changed from homogeneous combustion to stratified combustion, or if stratified combustion continues, upper limit STFMX and lower limit STFMN for the target equivalence ratio for stratified combustion are calculated from maps based on engine speed and load.

In step 14, the phase-delay-corrected target equivalence ratio TFBYAH is compared with the upper and lower limits set in step 11 or step 12 or step 13 to limit TFBYAH to the range defined between the upper and lower limits.

Since the lower limit for the target equivalence ratio during a stratified combustion to homogeneous combustion transient is set at a value greater than the lower limit for steady conditions, the adverse influence of the inner EGR gas on homogeneous combustion is avoided by increasing the equivalence ratio so as to ensure stable combustion and good acceleration performance.

Figure 5:
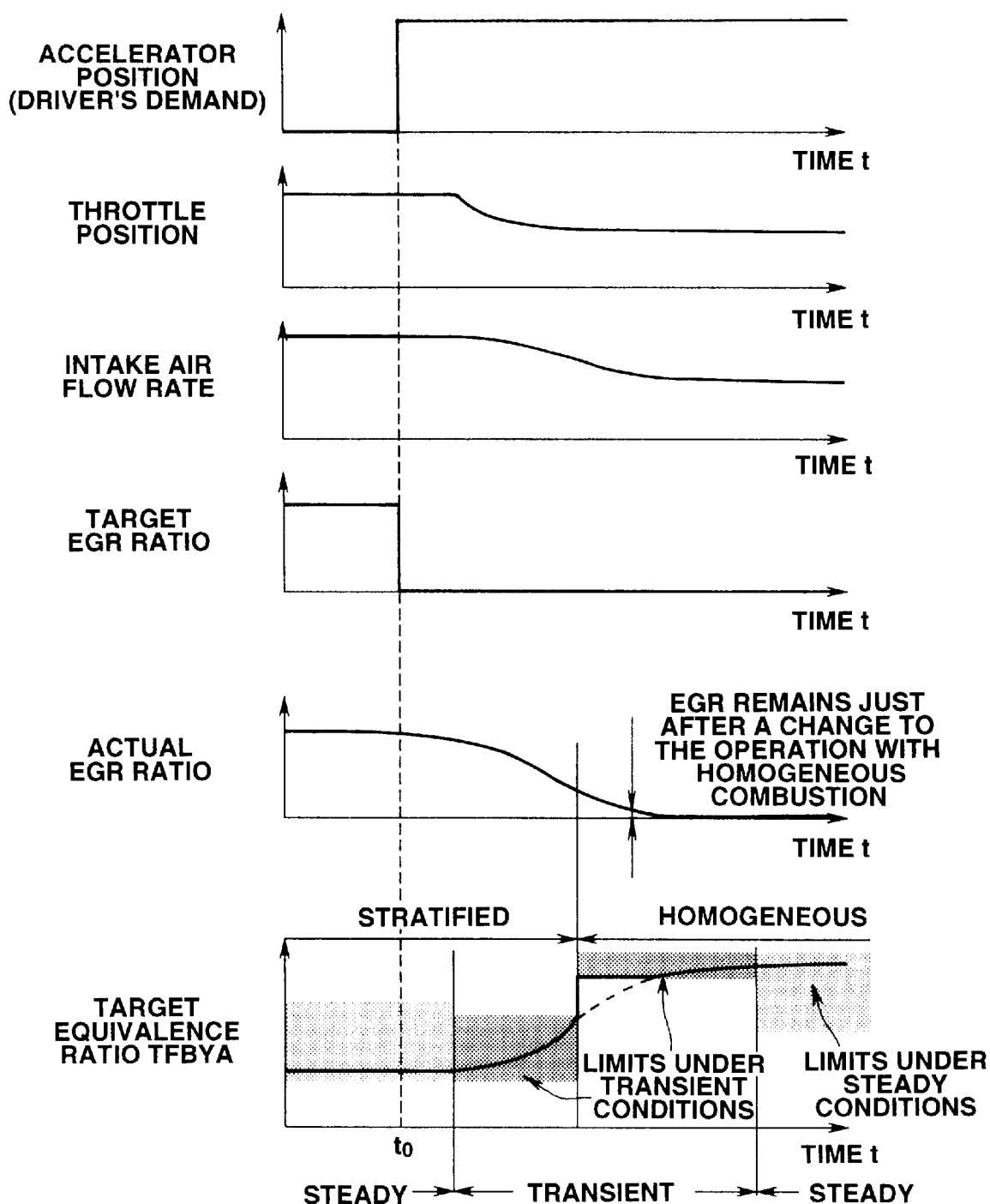
FIG. 5 is a time chart showing changes in various parameters.

FIG. 5 illustrates how various parameters change during a stratified combustion to homogeneous combustion transient. In FIG. 5, the driver depresses the accelerator pedal to demand more acceleration at a time $t_o$. Throttle position and intake air flow rate are reduced to prevent the engine from accelerating too quickly. The target EGR ratio is reduced at time $t_o$ in order to provide more power, in accordance with the driver's demand. However, although the target EGR ratio is reduced at time $t_o$, the actual EGR ratio changes more slowly over time such that exhaust gas remains when the engine switches to homogeneous combustion. The target equivalence ratio gradually increases to meet the driver's demand. During the transient period between steady-state stratified combustion and steady-state homogeneous combustion, the lower limit for target equivalence ratio is raised.

It is noted that FIG. 5 shows a variation of the procedure set forth in FIG. 4. More specifically, in the FIG. 4 procedure, the upper limit for target equivalence ratio is the same during both steady-state stratified combustion and transient stratified-combustion. In FIG. 5, the upper limit during transient stratified combustion is lower than the upper limit during steady-state stratified combustion.

FIG. 6 illustrates how certain parameters change during the various steady-state and transient conditions. In FIG. 6, region I corresponds to the steady-state stratified condition. Point II corresponds to the transition from stratified combustion to homogeneous combustion. Region III corresponds to homogeneous combustion just after the transition from stratified combustion to homogeneous combustion has occurred. Region IV corresponds to steady-state homogeneous combustion. Region V corresponds to homogeneous combustion during transition from homogeneous combustion to stratified combustion.

During region I, the processing of FIG. 4 proceeds in the following order:

S1→S2→S3→S4→S6→S8→S13→S14.

At point II, the processing proceeds in the following sequence:

S1→S2→S3→S4→S6→S7→S9→S10→S11→S→14.

During region III, the processing proceeds in the following sequence:

S1→S2→S3→S5→S6→S7→S9→S10→S11→S14.

During region IV, the processing proceeds in the following sequence:

S1→S2→S3→S5→S6→S7→S9→S10→S12→S14.

During region V, the processing proceeds in the following sequence:

S1→S2→S3→S5→S6→S7→S9→S10→S11→S14.

After TFBYAH is less than TFACH2, the processing continues in the steady-state stratified condition.

Returning to FIG. 3, after the limits on target equivalence ratio are set, control of the amount of air permitted to enter the engine (intake air flow rate) and the amount of fuel metered to the engine (fuel supply) with the use of the equivalence ratios will now be described.

A reference target intake air-flow rate calculating section H receives the accelerator operation degree APS, the engine speed Ne, or the target engine torque tTe, and it calculates a reference target intake air flow rate tTP from a map. The reference target intake air flow rate tTP is considered a reference equivalent ratio corresponding to the intake air flow rate for the stoichiometric air-fuel ratio. The reference target intake air flow rate tTP may be expressed in the form of a reference fuel supply (pulse width) corresponding to the intake air flow rate during one intake stroke, or the intake air flow rate for a unit time detected by the airflow meter 3.

A target intake air flow rate calculating section I calculates a target intake air flow rate tTP' corresponding to the basic target equivalence ratio TFBYAB. The target intake air flow rate tTP' may be calculated merely by dividing the reference target intake air flow rate tTP by the basic target equivalence ratio TFBYAB. However, actually, combustion efficiency and the required fuel supply are different since the basic target equivalence ratio TFBYAB is different in practice from the reference equivalence ratio. It is possible to calculate a target intake air flow rate tTP' which can satisfy both of the target torque and the target equivalence ratio by a correction according to the combustion efficiency. It is, therefore, desirable to calculate the target intake air flow rate tTP' by dividing the reference target intake air flow rate tTP by the basic target equivalence ratio TFBYAB and further by a combustion efficiency ITAF corresponding to the basic target equivalence ratio TFBYAB.

A target throttle valve opening degree calculating section J receives the target intake air flow rate tTP' and the engine speed Ne and it calculates a target throttle valve opening degree tTPS. The target throttle valve opening degree tTPS is the degree of opening of the throttle valve to obtain the target intake air flow rate tTP'.

The signal indicative of the target throttle valve opening tTPS is inputted to the throttle valve control unit 10 which in turn drives the throttle valve 9 to the target throttle valve opening degree tTPS.

The amount of fuel metered to the engine is calculated in a basic fuel supply calculating section K1 and a correcting section K2. The basic fuel supply calculating section K1 receives the intake air flow rate Q for unit time detected by the airflow meter 3 and the engine speed Ne and it calculates a basic fuel injection pulse width TP corresponding to the intake air flow rate during one intake stroke at the stoichiometric air-fuel ratio (reference equivalence ratio).

The correcting section K2 calculates an effective fuel injection pulse width TE by multiplying the basic fuel injection pulse width TP by the target equivalence ratio TFBYAH and also calculates a final fuel injection pulse width TI by adding an ineffective pulse width TS corresponding to the battery voltage to the effective fuel injection pulse width TE.

A signal indicative of the fuel injection pulse width TI is outputted to drive the fuel injector 6 so as to inject fuel in an amount corresponding to the target air-fuel ratio.

In such a manner, the intake air flow rate is controlled to its target value by throttle valve opening degree control and the fuel supply is controlled to its target value. This is effective to maintain the target equivalence ratio so as to provide good exhaust gas purifying performance and also to achieve required target torque so as to ensure good driving performance. Since the lower limit for the target equivalence ratio under transient conditions just after a change from operation with stratified combustion to operation with homogeneous combustion is set at a value greater than that for steady conditions, it is possible to avoid the adverse influence of external and internal EGR on homogeneous combustion that occurs during operation with stratified combustion so as to ensure stable combustion and good acceleration performance.

The entire contents of Japanese Patent Application No. 9-144171 (filed Jun. 2, 1997), and Press Information entitled "Nissan Direct-Injection Engine" (Document E1-2200-9709 of Nissan Motor Co., Ltd. of Tokyo, Japan) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A controller for an internal combustion engine having a cylinder and an injector to inject fuel directly into the cylinder, the controller comprising:

a discriminating section to detect a change of combustion in the cylinder from stratified combustion to homogeneous combustion;

a homogeneous transient condition discriminating section to detect a transient condition of operation with homogeneous combustion just after a change is made from operation with stratified combustion to operation with homogeneous combustion;

a homogeneous steady-state condition discriminating section to detect steady-state homogeneous combustion;

a section to calculate a ratio between air and fuel for the cylinder; and a limiter to limit the ratio between air and fuel in a range such that a minimum amount of fuel relative to an amount of air is increased when operating in said transient condition of operation with homogeneous combustion just after a change is made from operation with stratified combustion to operation with homogeneous combustion compared with the ratio between air and fuel during steady-state homogeneous combustion.

2. A controller as set forth in claim 1, wherein the homogeneous transient condition discriminating section detects said condition based on a parameter that has been corrected for air intake system delay.

3. A controller as set forth in claim 2, wherein the homogeneous transient condition discriminating section detects said condition based on a difference between said parameter that has been corrected for air intake system delay and said parameter not corrected for said air intake system delay.

4. A controller as set forth in claim 1, wherein the controller further comprises:

an EGR (exhaust gas recirculation) control section to control an EGR system to perform EGR during operation with stratified combustion and to inhibit EGR during operation with homogeneous combustion just after a change from operating with stratified combustion.

5. A controller as set forth in claim 1, wherein the limiter limits said ratio based upon engine operation conditions during operation with stratified combustion just before said change to homogeneous combustion.

6. A controller as set forth in claim 1, wherein said ratio is a target equivalence ratio.

7. A controller as set forth in claim 1, wherein the homogeneous steady-state condition discriminating section detects said steady-state homogeneous combustion based on a difference between phase-delay-corrected target equivalence ratio and basic target equivalence ratio.

8. A controller as set forth in claim 1, further comprising an EGR (exhaust gas recirculation) system.

* * * * *